United States Patent [19]

Herbst

[11] 3,912,409

[45] Oct. 14, 1975

[54] ROTARY FLUID SEAL FOR STEERING YOKE OF WHEEL MOTOR-DRIVEN VEHICLE

[75] Inventor: George D. Herbst, Milwaukie, Oreg.

[73] Assignee: Hyster Company, Portland, Oreg.

[22] Filed: Oct. 15, 1974

[21] Appl. No.: 514,417

Related U.S. Application Data

[62] Division of Ser. No. 217,916, Jan. 14, 1972.

[52] U.S. Cl. ............ 404/122; 180/79.2 R; 180/66 F
[51] Int. Cl.² .......................................... E01C 19/26
[58] Field of Search ......... 404/122, 125; 180/79.20, 180/66 F, 79.2 R, 79.2 A; 280/419, 420, 421, DIG. 7

[56] References Cited
UNITED STATES PATENTS

| | | | |
|---|---|---|---|
| 2,436,757 | 2/1948 | Lewis | 180/20 |
| 3,008,424 | 11/1961 | Roth | 180/66 F X |
| 3,063,511 | 11/1962 | Malmgren | 180/77 S X |
| 3,067,831 | 12/1962 | Willcock | 180/66 F |
| 3,108,520 | 10/1963 | Garris | 404/132 |
| 3,205,962 | 9/1965 | Anderson | 180/20 X |
| 3,303,762 | 2/1967 | Jennings | 404/117 |
| 3,395,626 | 8/1968 | Garris | 404/117 |
| 3,416,419 | 12/1968 | Kronholm | 404/122 |
| 3,463,063 | 8/1969 | Caron | 404/124 |
| 3,737,243 | 6/1973 | Dresher | 404/122 |

FOREIGN PATENTS OR APPLICATIONS 1,088,433  9/1960  Germany ............... 404/122

Primary Examiner—Nile C. Byers, Jr.
Attorney, Agent, or Firm—Klarquist, Sparkman, Campbell, Leigh, Hall & Whinston

[57] ABSTRACT

A self-propelled vibratory compactor has a one-piece frame supported at one end by a steel roller drum and at the other end by a yoke-mounted, single, high-flotation pneumatic rubber tire. The operator's compartment includes a pair of laterally opposed operator's seats at the opposite sides of the frame and is positioned on the frame over the pneumatic tire with steering, speed and directional controls positioned between the seats. An engine mounted on the frame behind and below the operator's compartment, but forwardly of the roller drum, drives hydraulic pumps which supply fluid to a hydraulic vibrator motor which drives an eccentric shaft within the roller drum, a hydraulic wheel motor which drives the pneumatic tire, and a hydraulic power steering system for turning the yoke. The yoke spindle mounts a rotary seal which transmits fluid between a pump on the frame and the wheel motor on the yoke. A thin, narrow, rearwardly extending frame portion mounts the vibratory roller drum so as to provide the operator with good visibility of the ends of the drum when working close to curbs and other structures.

8 Claims, 6 Drawing Figures

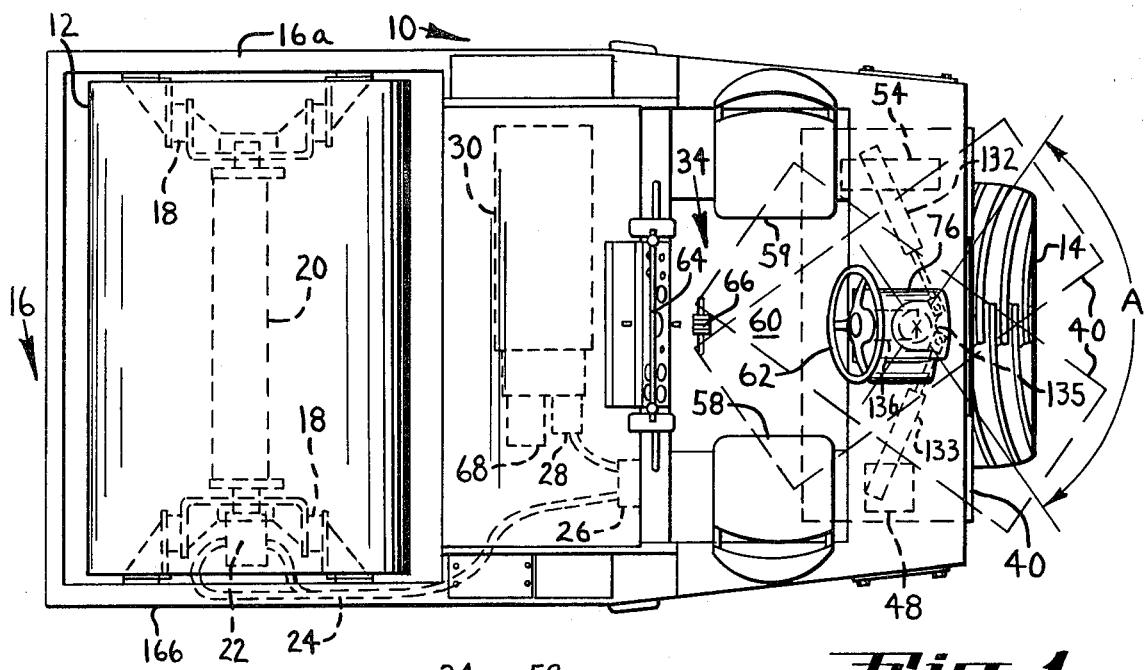
Fig. 1
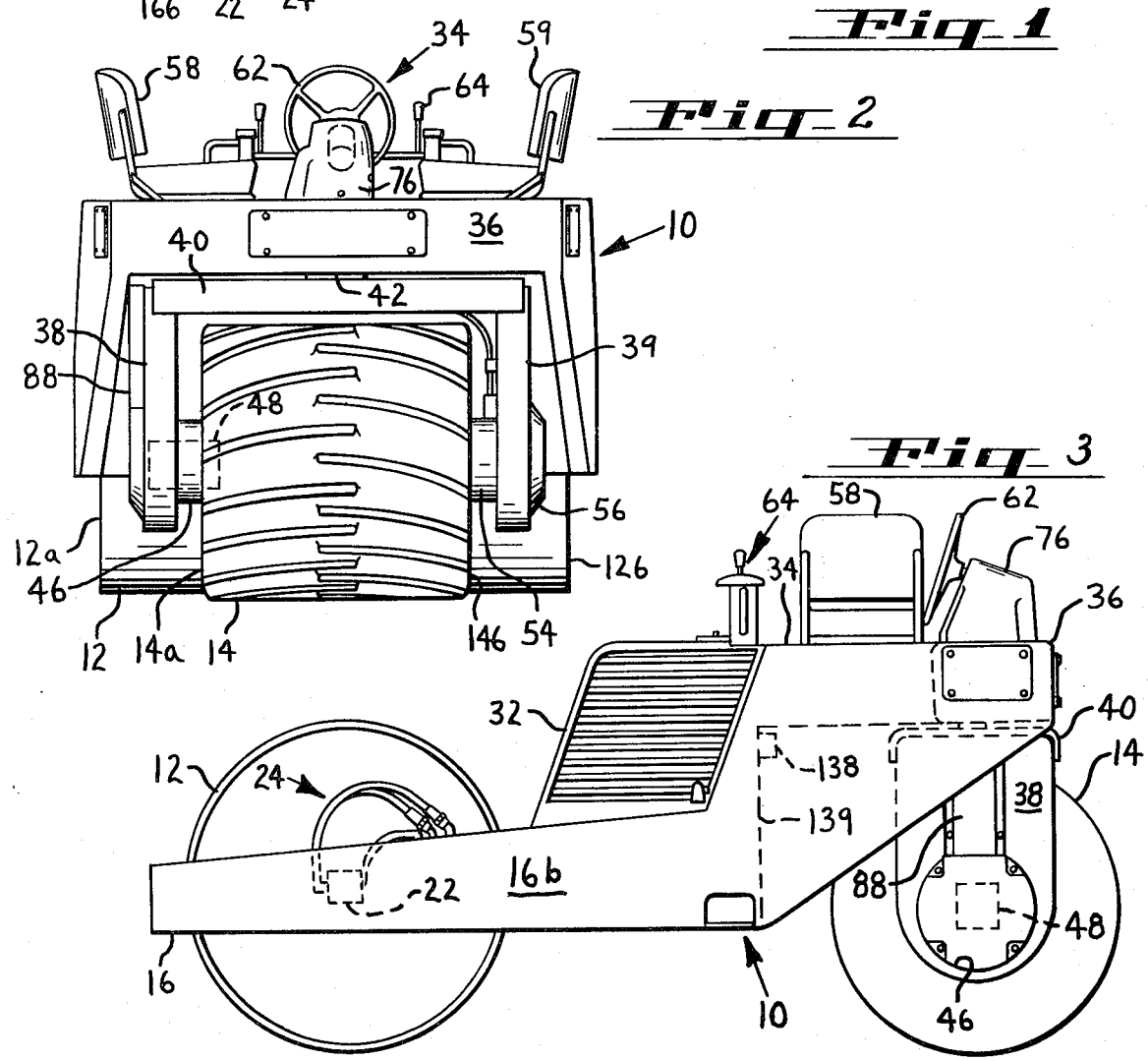
Fig. 2
Fig. 3

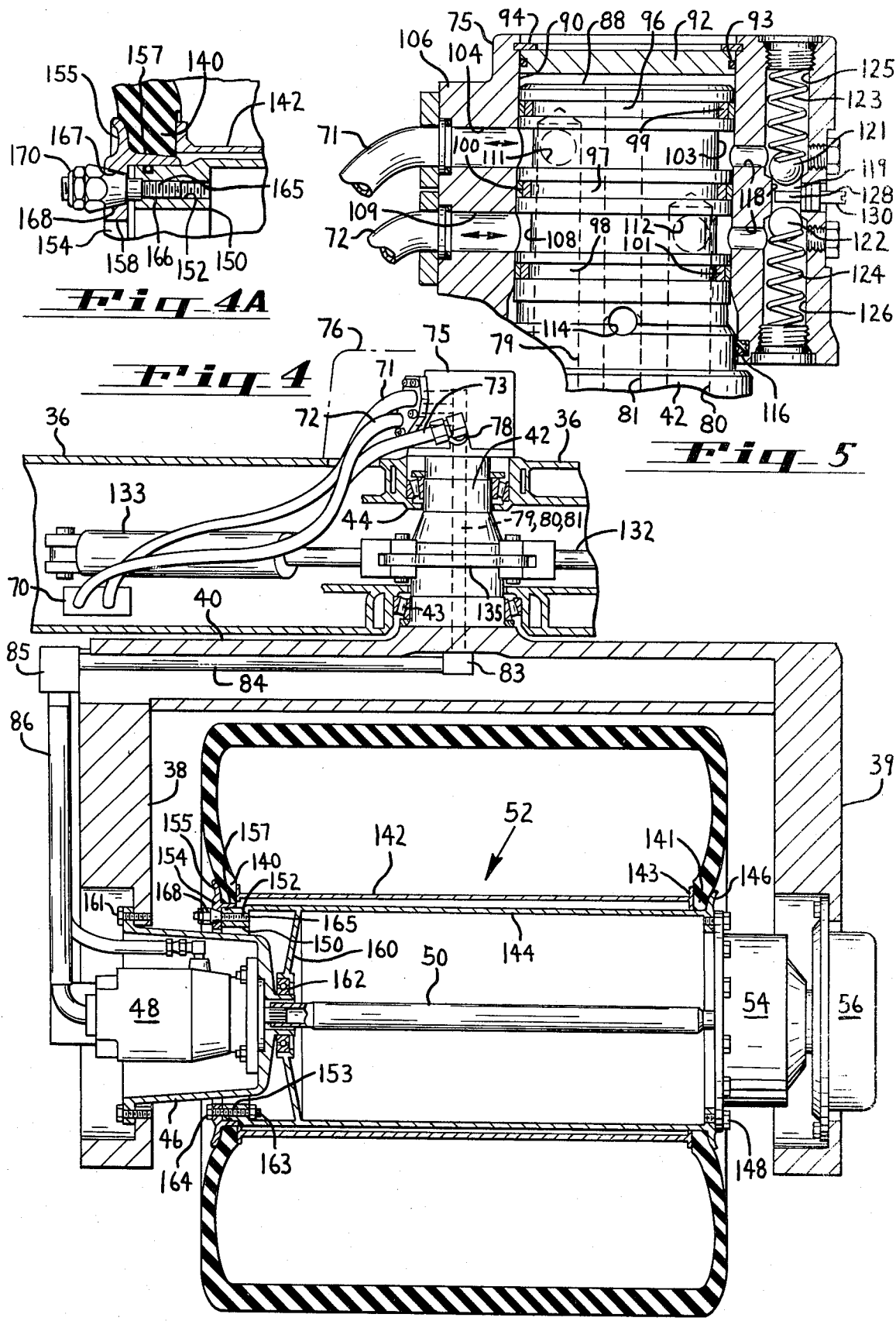

ROTARY FLUID SEAL FOR STEERING YOKE OF WHEEL MOTOR-DRIVEN VEHICLE

This is a division, of application Ser. No. 217,916 filed Jan. 14, 1972.

BACKGROUND OF THE INVENTION

1. Field of the Invention

The present invention relates to self-propelled vibratory compaction vehicles.

2. Description of the Prior Art

Most self-propelled vibratory compactors are characterized by an articulated frame with a joint at midframe separating the portion of the frame mounting the vibratory roller drum from the portion of the frame mounting the operator's compartment and drive wheels. Moreover, such prior vibratory compactors commonly have so-called center point steering at the point of articulation which has the disadvantage of providing the vehicle with a large turning radius which reduces maneuverability and thus slows production.

A further common disadvantage of prior self-propelled vibratory compactors is that they tend to lose traction, particularly on high lifts of loose sand, gravel or earth, because of the use of multiple high pressure pneumatic tires or steel wheels as the driving wheels, which provide high ground contact pressures and thus high rolling resistance.

Another common disadvantage of prior vibratory compactors is the poor operator visibility which results from the relatively great overall length of the vehicle caused in part by the articulated center point steering and in part by the arrangement of operator seating and controls with respect to the other vehicle components.

SUMMARY OF THE INVENTION

In accordance with the present invention a self-propelled vibratory compactor is provided with improved operator visibility and control, improved traction, shorter turning radius and greater overall compactness as compared to prior known vibratory compactors.

The foregoing advantages are attained in the compactor of the invention through provision of a unitary short rigid frame with a thin narrow frame portion at one end mounting the vibratory roller drum and a steering yoke at the opposite end mounting a single wide, high flotation, low pressure, pneumatic tire as the combined driving and steering wheel. The pneumatic tire is driven by a hydrostatic wheel motor supplied with hydraulic fluid through a unique rotary seal between the frame and the steering yoke. The tire is mounted on a special clamp-type wheel assembly which prevents slippage of the tire on its wheel despite the tire's low inflation pressure. Operator visibility and control are facilitated by positioning a pair of operator's seats high at opposite sides of the frame over the tire and above the level of the roller drum with controls positioned between the seats.

Low-pressure, high-flotation tires are commonly used on rough terrain vehicles for operating in wet, swampy or muddy terrain and on tractors for agricultural use in operating on cultivated fields without damaging crops or compacting the fields because of their characteristically low ground contact pressures. However, such tires have not been suggested for use on compaction equipment, no doubt because a high-flotation type tire would seem to be the very antithesis of compaction. However, it has been found that by combining in a compaction vehicle both a vibrating compaction drum delivering intermittently high ground contact pressures and a drive wheel having a high-flotation tire providing extremely low ground contact pressures, the compactor gives good compaction while at the same time having good traction working in loose, high lift materials.

The low rolling resistance and central yoke mounting and steering of the pneumatic tire enhance the traction, turning and maneuvering capabilities of the compactor.

Primary objects of the present invention are to provide a self-propelled vibratory compactor having improved traction, improved operator visibility and control, and greater maneuverability as compared to prior self-propelled vibratory compactors.

BRIEF DESCRIPTION OF THE DRAWINGS

The foregoing and other objects, features and advantages of the present invention will become more apparent from the following detailed description which proceeds with reference to the accompanying drawings, wherein:

FIG. 1 is a plan view of a compactor in accordance with the invention with internal components shown in hidden lines;

FIG. 2 is a front end view of the compactor of FIG. 1;

FIG. 3 is a side elevational view of the compactor of FIG. 1;

FIG. 4 is a partial vertical sectional view taken through a front end portion of the vehicle frame, yoke and wheel assembly;

FIG. 4A is an enlarged view of a portion of FIG. 4; and

FIG. 5 is a partial vertical sectional view through a rotary seal portion of FIG. 4.

DETAILED DESCRIPTION

General Arrangement

With reference to the drawings, FIGS. 1, 2 and 3 disclose a self-propelled vibratory compaction vehicle of the invention including a main frame supported at one end by a hollow, steel roller drum 12 and at the other end by a large, wide, low pressure high-flotation single pneumatic tire 14. The frame includes a rearwardly extending thin and narrow frame portion 16 defining a rectangular opening which receives roller drum 12. The longitudinal side frame member 16a, 16b of the rear frame portion rotatably mount the roller drum by rubber isolator members 18 extending between bracket portions of the frame and drum in a well-known manner. An eccentric vibrator shaft 20 is rotatably mounted in suitable bearings within the drum and is driven by a hydraulic motor 22 at one end of the drum. Hydraulic hoses 24 extend from the vibrator motor 22 partially within side frame member 16b to a suitable hydraulic control 26 and then from such control to a hydraulic pump 28 driven by an internal combustion engine 30. Engine 30 is mounted transversely on the frame within an engine housing 32 rearwardly of and below an operator's compartment 34. The operator's compartment is provided on a forward portion 36 of the main frame extending over pneumatic tire 14.

Pneumatic tire 14 is rotatably mounted between vertically extending arm portions 38, 39 of a steering yoke 40 having a yoke spindle or king pin 42. As shown in FIG. 4, spindle 42 is rotatably mounted in suitable roller bearings 43, 44 centrally of the forward frame portion 36. A lower portion of yoke arm 38 mounts a motor housing 46, which in turn mounts a hydraulic wheel motor 48 for driving pneumatic tire 14. Motor 48 is drivingly connected to a drive shaft 50 which extends centrally through a drive wheel assembly 52 to a planetary drive unit 54 at the opposite end of tire 14. The opposite arm 39 of yoke 40 carries a brake drum assembly 56 operable selectively by a control at the operator compartment 34.

Operator's compartment 34 includes a pair of oppositely disposed inwardly facing operator's seats 58, 59 at opposite sides of the vehicle frame above and forwardly of engine housing 32. The operator places his feet on a flat platform 60 extending between the seats. A steering wheel 62 is positioned between and forwardly of the seats at a position for easy access by the operator from either seat. Speed and directional controls indicated generally at 64 are mounted between the seats and rearwardly thereof also for easy access from either seat. A parking brake pedal 66 extends upwardly from platform 60 between the seats, and is equally accessible from either seat.

Because of the high positioning of the operator over the drive wheel and above the level of the roller drum and engine at either side of the vehicle, the operator has exceptional visibility beyond either end of the vehicle and to either end of the drum. This visibility is also enhanced by the short overall length of the vehicle resulting from elimination of any articulated frame or centerpoint steering, and by the mounting of the roller drum between thin, narrow frame members.

From FIG. 2 it will be seen that drive wheel 14 is centrally mounted between the opposite sides of the frame and has a width substantially as great as the diameter of the tire. However, the opposite ends 14a, 14b of the tire are positioned laterally inwardly of the opposite ends 12a, 12b of roller drum 14, thereby in operation placing the drive wheel on good solid footing, well away from the weak edge of a newly placed layer or "lift" of material to be compacted. In a successfully operated prototype of the machine, the single pneumatic tire used was a Goodyear brand size 44×41:00-16.1 "Terra-Tire"brand penumatic tire inflated to about 20 psi to provide low ground contact pressure. A representative pressure might be 13 psi, which is considerably below the ground contact pressure provided by an average man walking on an earth surface. Such a low contact pressure provides a high degree of flotation and minimum rolling resistance and therefore enables maximum traction. The low contact pressure results from the tire's tendency to spread out over a large area of the ground surface under its low inflation pressure.

Wheel Motor Drive

Referring to FIGS. 1 and 4, hydraulic fluid for driving wheel motor 48 is routed between such motor and a variable displacement hydraulic pump 68 driven by engine 30 on main frame 10 through hydraulic hoses which extend from pump 68 into the hollow interior of the forward end portion 36 of the frame at 70. From there the hydraulic hoses, including two high-pressure supply and return tubes 71, 72 and a lower pressure case drain tube 73, extend inside forward frame portion 36 and upwardly to hose connections at a rotary seal housing 75 forming part of a rotary seal unit within a steering housing 76. At the rotary seal housing 75 hydraulic tubes 71, 72, 73 communicate respectively with hydraulic passages including three internal passages 79, 80, 81, shown in FIG. 5, which pass downwardly through the rotary seal and yoke spindle 42. The lower ends of such passages terminate at a junction block 83 within yoke 40. Three corresponding tubes within a tube assembly 84 pass horizontally from junction block 83 to a second junction block 85 just outside the upper end of yoke arm 38. From there three additional corresponding hose sections pass vertically downwardly at 86 along yoke arm 38 to hydraulic motor 48. A hose cover 87 (see FIGS. 1 and 2) is normally attached to the outside of yoke arm 38 and thereby shields the hoses from damage.

The details of the rotary seal unit are shown in FIG. 5. Such unit includes in addition to seal housing 75 fixed to the upper surface of forward frame portion 36, a generally cylindrical rotary seal shaft 88 rotatable within a cylindrical bore 90 of seal housing 75. Rotary seal shaft 88 is fixed to and forms an upper extension of yoke spindle 42. Bore 90 is closed at its upper end by a seal carrier member 92 having an annular groove which carries an O-ring seal 93 in engagement with the wall of bore 90. The seal carrier is retained in the bore by a snap ring 94.

Rotary seal shaft 88 includes three vertically spaced annular seal grooves 96, 97, 98 retaining, respectively, high pressure sealing ring assemblies 99, 100, 101 providing fluid sealing engagement between the rotary seal shaft 88 and the bore of stationary seal housing 75. Between seal grooves 96 and 97 an annular fluid groove 103 in shaft 88 communicates with a fluid port 104 extending through a wall of rotary seal housing 75 to connect with high-pressure hydraulic tube 71.

A second annular fluid groove 108 in rotary seal shaft 88 between seal grooves 97 and 98 communicates with a fluid port 109 extending through housing 75 to connect with high-pressure tube 72.

The previously mentioned axial fluid passages 79, 80 pass through the yoke spindle into the interior of rotary seal shaft 88 to the level of their respective annular fluid grooves 103, 108. Horizontal passages 111, 112, respectively, interconnect fluid grooves 103, 108 with their corresponding axial passages 79, 80 to provide fluid communication between high-pressure hoses 71, 72 and such axial fluid passages.

The third, low-pressure case drain hose 73 is connected to a lower portion of rotary seal housing 75 at 78 and communicates with the axial case drain passage 81 through a port (not shown) passing through rotary seal housing 75 and a horizontally extending passage 114 in rotary spindle 42. Another annular seal 116 is retained within an annular groove at the lower end of bore 90 to provide a fluid seal between the bore and shaft below case drain passage 114 to prevent leakage of fluid from the lower end of the bore.

A further feature of the rotary seal assembly includes a bypass passage and valve means to short-circuit fluid flow between the two fluid grooves 103, 108. An internal passage 118 having two horizontal legs and one vertical leg within a wall portion of rotary seal housing 75 interconnects the high-pressure, annular fluid grooves 103, 108. A valve means normally shuts off communication between the two mentioned fluid grooves. Such valve means includes two vertically opposed valve balls 121, 122 biased by springs 123, 124 against seats formed by the intersection of spring bores 125, 126 with the smaller vertical leg of passage 118 to close passage 118. A rotatable cam member 128, having thin opposed edges and broad opposed faces, extends between balls 121, 122 and can be rotated manually to lift the balls from their seats and thereby open passage 118 to the flow of fluid between grooves 103 and 108. The cam is turned by inserting a screwdriver blade within the end slot provided in an extension 130 of the cam.

The bypass valve means described is moved from its normally closed position to an open position to permit fluid communication between the annular grooves when the compactor vehicle is to be towed. This connects the system high-pressure line directly to the low-pressure line during towing of the unit, thereby allowing the motor to turn without circulating oil back to the pump, which would cause a hydraulic lock in the system.

In operation, oil is transferred by the tubes 71, 72 through the annular fluid grooves in the rotary seal shaft, through the axial drilled passages 79, 80 of the shaft and yoke spindle and through the tube and hose assemblies 84, 86 between the wheel motor and pump 68. The case drain passage 81 connects a case drain line from the wheel motor to the case drain port in pump 68. The case drain line also carries oil that may leak past the two high-pressure seals 99, 101 within seal grooves 96, 98 of the rotary seal shaft. Thus the rotary seal assembly provides a rotating hydraulic connection between the hydrostatic transmission pump and motor.

Steering System

The compactor is steered by turning yoke 40 about its spindle axis to rotate tire 14 about the same axis. For this purpose a pair of double-acting hydraulic steering cylinders 132, 133 have their piston rod ends connected to a steering arm 135 fixed to yoke spindle 42, with the opposite ends of the steering cylinders connected to forward portion 36 of the vehicle frame. Hydraulic pump 28 supplies pressure fluid through suitable lines (not shown) to a hand pump 136 controlled by steering wheel 62. The hand pump in turn controls the flow of fluid to and from the opposite ends of the left- and right-hand steering cylinders 132, 133 through additional lines (not shown). Hand pump 136 is housed within the steering housing 76.

The strokes of steering cylinders 132, 133 are sufficient such that yoke 40 can be turned through the arc A shown in FIG. 1 to a point where one or the other of the opposite rear corners of the yoke strike a stop member 138 shown in hidden lines in FIG. 3 projecting from a relieved portion 139 of the main frame.

The single yoke-mounted single wheel steering arrangement shown gives the compactor an extremely small turning radius. For example, in a prototype of the illustrated compactor having an overall length of 150 inches and an overall width of 80 inches, the compactor is capable of describing turning circles having an 18-inch inside radius and an 11-½ foot outside radius.

Tire Assembly and Mounting

Tire 14 is inflated to a relatively low pressure to provide a large tire surface area in contact with the ground and thus a low ground contact pressure. The low contact pressure provides a high degree of flotation for maximum traction and minimum rolling resistance. For example, in the previously mentioned prototype vehicle weighing 14,000 pounds and using a single Goodyear brand "Terra Tire" of 44:00×41 size, the tire is inflated to about 20 psi. Such a low inflation pressure requires a special clamp-type tire mounting assembly 52 as shown in FIGS. 4 and 4A.

In such assembly, tire 14 has beads 140, 141 which are engaged along their inner surfaces by flanged end portions 143 of a cylindrical spacer member 142. A wheel 144 fits concentrically within the spacer 142 and includes a flanged end 146 which engages an outer face of bead 141 at the planetary end of the tire. Thus tire bead 141 is clamped between flanged end 143 of spacer 142 and the corresponding flanged end 146 of wheel 144. The planetary drive unit 54 is fastened by cap screws 148 directly to the flanged end of wheel 144.

The opposite end of wheel 144 terminates in a rim 150 without any corresponding flanges but includes alternating threaded and unthreaded axial holes 152, 153 respectively at intervals around the rim. Rim 150 is covered by a cover plate 154 having a peripheral flange 155 which engages the outer face of tire bead 140 in position to flange 143 of spacer 142. The cover plate includes a second flange portion 157 at approximately right angles to flange 155 which slips between the inner periphery of tire bead 140 and wheel rim 150.

Cover plate 154 has a central opening 158 through which wheel motor housing 46 extends into mounting engagement with a web portion 160 of wheel 144. Web 160 mounts a wheel ball-bearing assembly 162 for rotatably mounting the wheel and tire assembly with respect to wheel motor housing 46. The wheel motor housing is fastened to yoke arm 38 by cap screws 161. Drive shaft 50 is coupled to an output shaft from wheel motor 48 within an axial extension of motor housing 46 within a central opening defined by wheel web 160.

The unthreaded holes 153 in wheel rim 150 receive cap screws 164 which secure cover plate 154 to wheel rim 150 with the aid of a lock nut 163. However, the threaded holes 152 serve as part of a take-up means which also includes a stud 165 having a threaded shank portion 166 in threaded engagement with threaded hole 152. Stud 165 projects outwardly of rim 150 and through a tapered hole 167 of cover plate 154 in registration with threaded hole 152. Tapered hole 167 receives a special tapered nut 168 threaded onto a threaded outer portion of stud 165. As the tapered nut is threaded onto stud 165, it draws cover plate 154 and wheel end 150 together, thereby applying a clamping force to bead 140 through cover plate flange 155 and the opposing flange 143 of spacer 142. At the same time, because wheel 144 spans the width of the tire and is provided with flange 146, as wheel rim 150 is drawn toward cover plate 154, wheel flange 146 is drawn against tire bead 141 at the planetary end of the wheel to compress bead 141 between wheel flange 146 and the opposing spacer flange 143. When tapered nut 168 is torqued to the desired extent to apply the required clamping force to tire beads 140, 141, a lock nut 170 is threaded onto the outer portion of stud 165 and up against tapered nut 168 to maintain the desired clamping force.

The tire bead-contacting surfaces of wheel 144 and cover plate 154 may be serrated if desired to increase the bead-gripping capability of the flanges and thereby further reduce the possibility of tire slippage on the wheel.

With the foregoing wheel and tire clamping assembly, the tire cannot be removed accidentally from the wheel in servicing either the wheel motor or the planetary unit. It will be apparent from FIG. 4 that removal of planetary unit 54 from wheel 144 by removing cap screws 148 will have no effect on the clamping force exerted on the adjacent tire bead 141. At the opposite end of the wheel it will be apparent that cap screws 164 cannot be removed to release the clamping pressure of the wheel assembly on the tire beads until wheel motor housing 46 is first removed from the opening of cover plate 155 to give access to the lock nuts 163, even though studs 165 or nuts 168 might be accidentally removed from wheel rim 150.

OPERATION

The compaction vehicle as described is designed to operate in forward and reverse directions over lifts of sand, gravel and earth. The machine could aslo be used on asphalt, with proper cleaners and a smooth tire. The vehicle can be operated from either seat with equal facility. The use of the high flotation single tire provides excellent traction and low rolling resistance even when the lifts under compaction are high and composed of loose material. Visibility beyond either end of the vehicle is good because of the operator's high position above both the drive wheel and the drum and because of the lack of obstruction from other components of the vehicle. Good visibility to the opposite ends of the drum for working close to curbs, walls or other structures is provided by the thin, narrow frame member 16 and the positioning of the operator's seats at opposite sides of the frame. Excellent maneuverability is provided by the overall compactness of the vehicle coupled with the short turning radius provided by the single yoke-mounted steerable tire which can be turned through a wide arc. The hydrostatic wheel motor drive is continuously variable.

Having illustrated and described what is presently a preferred form of the invention, it should be apparent to those skilled in the art that the same permits of modification in arrangement and detail. I claim as my invention all such modifications as come within the true spirit and scope of the following claims.

I claim:

1. In a self-propelled compaction vehicle having a main frame, a compaction wheel at one end of said frame and a steerable yoke-mounted driving wheel at the opposite end of said frame driven by a hydraulic wheel motor, said yoke including a yoke spindle rotatably mounting said yoke to said frame, ann engine-driven pump means on said frame for supplying said wheel motor with pressure fluid, and hydraulic passage means extending between said wheel motor on said yoke and said pump means on said frame,
   a rotary seal means for transmitting pressure fluid between said yoke and said frame comprising:
   a seal housing on said frame having an interior wall defining a bore,
   a seal shaft rotatable within said bore about the axis of rotation of said yoke spindle,
   means defining a pair of first and second annular fluid grooves in said seal shaft at vertically spaced-apart positions along said shaft,
   a fluid port extending through said seal housing to said interior bore wall and into fluid communication with each of said annular fluid grooves,
   first fluid passage means extending lengthwise through said yoke spindle and continuing into the interior of said seal shaft and into communication with said first annular fluid groove,
   a second fluid passage means extending lengthwise through said yoke spindle and continuing into the interior of said seal shaft and communicating with said second annular fluid groove,
   a first annular fluid sealing means extending between said interior bore wall and said shaft at a vertical first level above said annular fluid grooves,
   and a second annular fluid sealing means extending between said interior bore wall and said shaft at a vertical second level below said annular fluid grooves.

2. Apparatus according to claim 1 including a third annular fluid sealing means extending between said interior bore wall and said shaft at a vertical level between said first and second annular fluid grooves.

3. Apparatus according to claim 1 wherein said seal shaft comprises a vertical extension of said yoke spindle extending upwardly from said yoke spindle.

4. Apparatus according to claim 1 wherein said stationary seal housing includes internal bypass passage means interconnecting said first and second annular fluid grooves, bypass valve means normally closing said internal passage means to the flow of pressure fluid between said first and second annular fluid grooves, and selectively operable means for opening said valve means to permit the flow of pressure fluid through said bypass passage means between said first and second annular fluid grooves.

5. Apparatus according to claim 2 wherein said first and second annular grooves are provided in an interior bore wall-confronting surface of said shaft and said first, second and third annular fluid sealing means comprise annular sealing grooves in said shaft surface and sealing ring means in said grooves.

6. Apparatus according to claim 1 including a third fluid port extending through said seal housing and communicating with said bore at a vertical third level below said second annular fluid seal, said bore providing an annular fluid passage between said housing interior wall and said shaft at said third level, third fluid passage means extending lengthwise through said yoke spindle and into said seal shaft and communicating with said bore through a port at said third level so that said third housing port is in fluid communication with said third yoke spindle fluid passage means, and third annular sealing means at a vertical level below said third level for preventing leakage of fluid from the lower end of said seal housing bore.

7. Apparatus according to claim 6 wherein said first and second annular fluid sealing means comprise high-pressure seals and said third annular sealing means comprises a low-pressure seal, and a third annular high-pressure seal between said housing bore wall and said seal shaft at a level between said annular fluid grooves so as to prevent fluid flow between said fluid grooves within said bore.

8. Apparatus according to claim 6 wherein said third fluid passage means extends through said seal shaft to communicate with an upper portion of said seal housing bore above said first annular fluid sealing means whereby fluid leakage upwardly past said first annular sealing means is returned to the hydraulic fluid system through said third fluid passage means.

* * * * *